J. V. B. CARTER & J. DWYER.

BASE-BURNING STOVES FOR HEATING AND COOKING.

No. 6,979. Reissued March 7, 1876.

Witnesses:
Chas. Thurman
R. T. Dyer.

Inventor:
John V. B. Carter
James Dwyer
by Thos. S. Spray
Atty.

N. PETERS, PHOTO-LITHOGRAPHER, WASHINGTON, D. C.

2 Sheets—Sheet 2.

J. V. B. CARTER & J. DWYER.

BASE-BURNING STOVES FOR HEATING AND COOKING.

No. 6,979. Reissued March 7, 1876.

*Attest:*
C. H. Fritz
Chas. Thorman.

*Inventors:*
John V. B. Carter
James Dwyer
by Thos. S. Sprague
Attorney

N. PETERS, PHOTO-LITHOGRAPHER, WASHINGTON, D. C.

UNITED STATES PATENT OFFICE.

JOHN V. B. CARTER AND JAMES DWYER, OF DETROIT, MICH., ASSIGNORS TO THE DETROIT STOVE-WORKS.

IMPROVEMENT IN BASE-BURNING STOVES FOR HEATING AND COOKING.

Specification forming part of Letters Patent No. 131,936, dated October 8, 1872; reissue No. 5,927, dated June 23, 1874; reissue No. 6,979, dated March 7, 1876; application filed November 23, 1875.

*To all whom it may concern:*

Be it known that we, JOHN V. B. CARTER and JAMES DWYER, of Detroit, in the county of Wayne, and State of Michigan, have invented an Improvement in Base-Burning Stoves for Heating and Cooking, of which the following is a specification.

The nature of our invention relates to certain improvements in that class of heating-stoves known as "base-burners," provided with diving-flues, by the attachment thereto of an oven upon the rear, at a point opposite the fire-pot, with its upper and under surfaces at or nearly in the same plane with the top of the fire-pot and the bottom of the ash-pit; said attachment being adapted to be heated by the products of combustion in their passage from the combustion-chamber to the exit, and to form the rear wall of the rear ascending flue, and adapted so that baking and cooking generally may be successfully carried on.

This attachment we technically term a "low-down oven," in contradistinction to ovens heretofore attached to stoves of a similar class above the mica-section, and generally back of the magazine.

Figure 1:
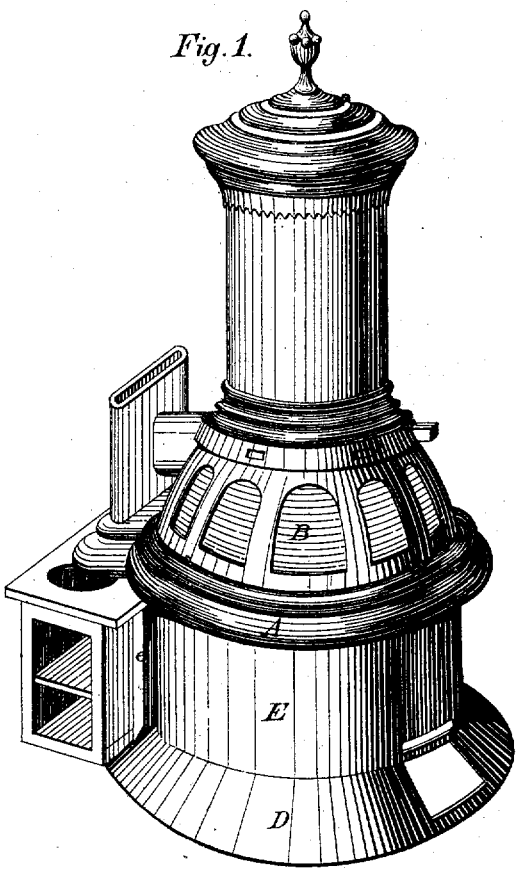
Figure 2:
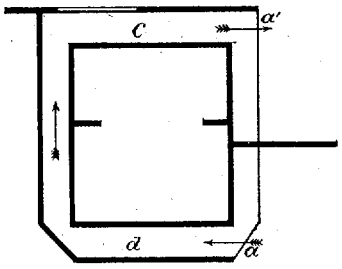
Figure 3:
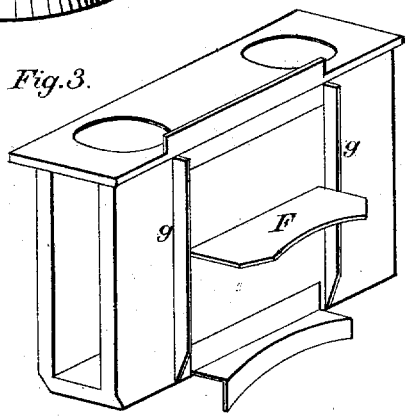
Figure 4:
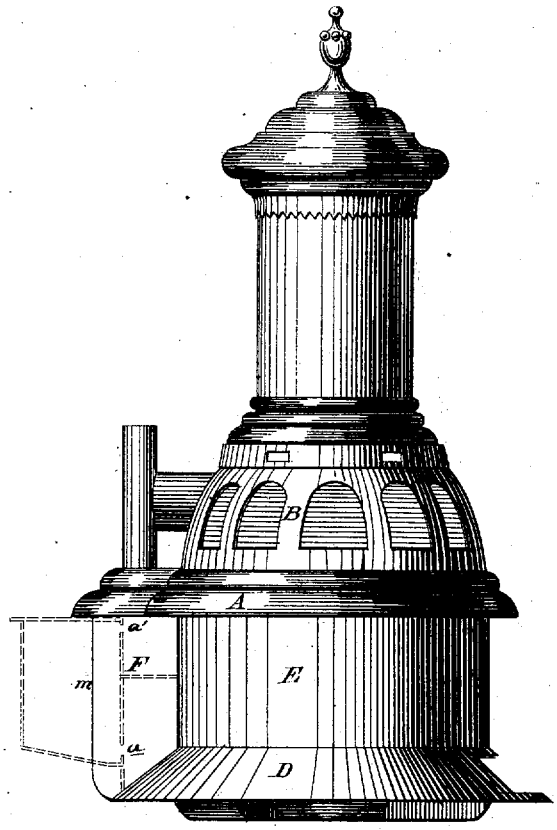
Figure 5:
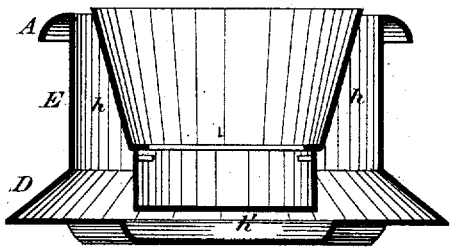

Figure 1 is a perspective view of a base-burning diving-flue heating-stove provided with our low-down culinary attachment. Fig. 2 is a cross-section of the oven. Fig. 3 is a perspective view of the oven detached. Fig. 4 is a side elevation of our stove, with the culinary attachment shown in dotted lines. Fig. 5 is a vertical central section, from side to side, of the fire-pot section and base, showing the diving and base flues.

Like letters refer to like parts in each figure.

The top of the oven is secured to the ring A, which is the base of the combustion-chamber proper B, and which is provided with proper pipe-collars, upon which the exit pipe rests. The bottom of the attachment rests upon the base-ring D, and the vertical walls are secured between the top and bottom plates in the usual manner. The oven is double-walled, as shown in the drawing, from which its construction will be readily understood. It is provided with suitable openings *a a'*, the former communicating with flue *d* under the bottom of the oven, and with base-flues *h'*, and the latter communicating with the flue *c* above the oven and exit-flue, and these openings are so adapted as to receive (when the proper damper is closed, so as to revert the products of combustion toward the base of the stove) the currents of hot air and conduct them around the oven, and thence to the exit, as indicated by the arrows. The attachment is provided (when the plates are not cast together) with the vertical ribs *g*, which embrace the flanges *e* of the cylindrically-shaped fire-pot section E, to make a gas-tight joint when cemented. These ribs *g* form the side plates of the rear inclosed vertical flue, the back plate *m* of which is removed when it is desired to mount the stove with the oven attachment, and in this case said oven attachment forms the back of said flue. It is provided with a horizontal damper-plate, F, extending through the ascending flue, so that when the draft is reverted through the base of the stove this plate will arrest the upward passage of the heated currents through the ascending flue, and compel them to pass through the openings *a*, and around the oven to the exit. It will be seen that this arrangement of the oven opposite the fire-pot section not only allows it to be heated for culinary purposes at will, but it keeps the oven warm at all times, to answer the purposes of a hot-closet, when the draft is not reverted.

It will also further be seen that the use of the oven does not detract in the slightest degree from the heating properties of the stove, as the heat is not utilized by the oven until it has been brought into contact with all the radiating-plates of the stove.

What we claim as our invention, and desire to secure by Letters Patent, is—

1. In a diving-flue heating-stove, with its ascending flue incased within the walls of the stove, and on the rear thereof, the combination of a culinary attachment, supported at the rear end upon the base, and between said base and the ring which forms the base of the combustion-chamber proper, and adapted to be heated by the products of combustion in their passage from the combustion-chamber to the exit.

2. In a diving-flue cylindrical-shaped heating-stove, and in combination therewith, a culinary attachment, adapted to be placed upon the rear of said stove, with openings communicating with corresponding openings in the walls of the ascending flue, substantially as and for the purposes described.

3. In a diving-flue heating-stove, a low-down double-walled oven or culinary attachment, located in rear of the fire-pot, with its upper and under surfaces in the same planes, or nearly in the same planes, with the top and bottom of said fire-pot, in combination with a rear incased ascending flue.

4. In combination with a heating-stove having revertible and base flues, a culinary attachment placed directly against the rear flues of said stove, so that the inner wall or front of said culinary attachment is adapted to be heated by direct radiation from the fire-pot, while the other walls of said attachment are heated by the products of combustion in their passage from the base to the exit, substantially as and for the purposes set forth.

5. In a heating-stove, and in combination therewith, a culinary attachment provided with suitable openings, to allow the products of combustion to be directed from the flues of a revertible flue heating-stove into the inclosed flue space surrounding the oven, placed between the ring which forms the base of the combustion-chamber proper and the base of the stove, substantially as shown and described.

JOHN V. B. CARTER.
JAMES DWYER.

Witnesses:
H. F. EBERTS,
CHAS. J. HUNT.